(12) United States Patent
Belford et al.

(10) Patent No.: US 7,644,735 B2
(45) Date of Patent: Jan. 12, 2010

(54) PIPE INSERT

(75) Inventors: James-Wallace Belford, Mobile Post Hefer (IL); Abed Masarwa, Taibe (IL)

(73) Assignee: Netafim, Ltd., Tel Aviv (IL)

( * ) Notice: Subject to any disclaimer, the term of this patent is extended or adjusted under 35 U.S.C. 154(b) by 434 days.

(21) Appl. No.: 11/442,231

(22) Filed: May 30, 2006

(65) Prior Publication Data

US 2007/0277893 A1 Dec. 6, 2007

(51) Int. Cl.
  *F16L 55/10* (2006.01)
(52) U.S. Cl. ............................. 138/92; 138/94; 239/542
(58) Field of Classification Search ................... 138/92, 138/94; 239/542
  See application file for complete search history.

(56) References Cited

U.S. PATENT DOCUMENTS

| 2,626,820 | A |   | 1/1953  | Dons et al.    |         |
|-----------|---|---|---------|----------------|---------|
| 2,780,232 | A |   | 2/1957  | Ney            |         |
| 3,181,899 | A | * | 5/1965  | McKnight, Jr.  | 285/139.2 |
| 3,753,527 | A |   | 8/1973  | Galbraith et al. |       |
| 3,882,892 | A | * | 5/1975  | Menzel         | 137/513.3 |
| 4,278,279 | A | * | 7/1981  | Zimmerman      | 285/255 |
| 4,752,031 | A | * | 6/1988  | Merrick        | 239/193 |
| 4,852,916 | A |   | 8/1989  | Johnson        |         |
| 5,295,506 | A | * | 3/1994  | Smith          | 137/271 |
| 5,507,536 | A | * | 4/1996  | Oliveto et al. | 285/196 |
| 5,553,786 | A | * | 9/1996  | Israel         | 239/456 |
| 5,560,654 | A |   | 10/1996 | Cobb, Jr.      |         |
| 6,557,788 | B1 |   | 5/2003  | Huang         |         |
| 6,871,880 | B1 | * | 3/2005  | Olson         | 285/192 |
| 7,048,010 | B2 | * | 5/2006  | Golan et al.  | 138/119 |
| 2001/0054821 | A1 | * | 12/2001 | Volcansek  | 285/382.7 |
| 2004/0050975 | A1 | * | 3/2004  | Panourgias et al. | 239/542 |
| 2005/0194469 | A1 | * | 9/2005  | Masarwa et al. | 239/542 |

FOREIGN PATENT DOCUMENTS

| EP | 0 187 010       | 7/1986  |
| EP | 0 298 170 A1    | 1/1989  |
| GB | 2 187 622 A     | 9/1987  |
| GB | 2 298 908 A     | 9/1996  |
| WO | 2004/098269 A2  | 11/2004 |
| WO | 2005/057074 A1  | 6/2005  |

* cited by examiner

*Primary Examiner*—James F Hook
(74) *Attorney, Agent, or Firm*—Womble Carlyle

(57) ABSTRACT

There is provided an insert to be sealingly mounted into a plug hole of a pipe having a sealing area surrounding the plug hole. The insert comprises an internal unit and a fastener. The internal unit and the fastener have corresponding cooperating sealing portions and mounting portions. The sealing portion of the internal unit is formed with a flange adapted to be forced into the plug hole. The flange and the sealing portion of the fastener have corresponding sealing surfaces. These surfaces are adapted to sealingly clamp therebetween the sealing area of the pipe, when the insert is mounted into the plug hole. One of the sealing surfaces being in the form of a sealing edge and the other being in the form of a conical surface. When the fastener is mounted onto the internal unit, the sealing portions of the internal unit and the fastener form therebetween a chamber. The chamber is in fluid communication with the outside environment, allowing atmospheric pressure within the chamber.

26 Claims, 3 Drawing Sheets

PIPE INSERT

FIELD OF THE INVENTION

This invention relates to pipe inserts to be sealingly mounted on a pipe such as, for example, pipe connectors, in particular for use with flexible pipes such as for example lay-flat pipes.

BACKGROUND OF THE INVENTION

A lay-flat pipe is a pipe which, when unpressurised, is substantially flat and, when pressurized by a relatively low pressure, has a substantially circular cross section, similar to a fire hose. Such pipes are usually made of a flexible material and are mainly employed in irrigation systems, where they may be used as manifold pipes.

In the field of irrigation, such pipes are normally formed with plug holes disposed along the pipe, the pipe area surrounding each plug hole being used for mounting thereon pipe inserts for connection thereto of additional irrigation means such as branch pipes or the like, as disclosed for example in GB 2,187,622. Alternatively, inserts may be used to plug holes that are not in use, such as disclosed for example in U.S. Pat. No. 5,560,654. In both cases, the inserts have to be sealingly mounted into the plug holes to prevent leakage of liquid from the pipe, the pipe area surrounding each plug hole thus constituting the pipe's sealing area.

Inserts of the above kind normally comprise an internal unit and a fastener, each having a sealing portion and a mounting portion, such as disclosed in GB 2,187,622 mentioned above. The sealing portion of the internal unit is formed with a flange adapted to be forced into a plug hole. The mounting portion of the fastener is adapted to be snapped or screwed onto the mounting portion of the internal unit, so as to clamp the sealing area of the pipe surrounding the plug hole between the sealing portions of the internal unit and the fastener. The flange is usually formed with a raised edge adapted to facilitate sealing contact with the pipe's sealing area.

SUMMARY OF THE INVENTION

According to a first aspect of the present invention, there is provided an insert to be sealingly mounted into a plug hole of a pipe, said pipe having a sealing area surrounding said plug hole, said insert comprising an internal unit and a fastener, said internal unit and said fastener having corresponding cooperating sealing portions and mounting portions, said sealing portion of the internal unit being formed with a flange adapted to be forced into said plug hole; said flange and said sealing portion of the fastener having corresponding sealing surfaces adapted to sealingly clamp therebetween said sealing area of said pipe, when the insert is mounted into the plug hole; one of said sealing surfaces being in the form of a sealing edge and the other being a conical surface.

The insert having a longitudinal axis adapted to coincide with that of the hole of the pipe, the conical surface may have an axis coinciding with, or parallel to, said longitudinal axis, and the sealing edge may have an axial extension smaller than that of the conical surface, allowing said clamping of the sealing area of the pipe at different axial locations along the conical surface depending on the thickness of the pipe.

In one embodiment of the insert, the flange is formed with said sealing edge and the fastener is formed with said conical surface, the latter being adapted to press said sealing area of said pipe against said sealing edge of said internal unit, to provide the required sealing. In this case, the flange will have a maximal diameter $D_F$ generally greater than $D_{PH}$, and the conical surface of the sealing portion of the fastener will have a narrow end of a small diameter ($D_{C2}$) and a wide end of a large diameter ($D_{C1}$), wherein $D_{C1} > D_F > D_{C2}$, the narrow end being further remote from the pipe than the wide end.

In operation, the internal unit's sealing portion is forced into the pipe's wall through the plug hole, such that the flange comes in contact with the inside of the pipe, and the mounting portion of the internal unit projects out of the pipe, through the plug hole. The fastener's mounting portion is then screwed onto said mounting portion of the internal unit until the conical surface of the sealing portion of the fastener securely clamps the sealing area of the pipe against the sealing edge of the flange of the internal unit. Due to the fact that such clamping may take place at any location of the conical surface along its longitudinal axis, the insert may be mounted on pipes having different thicknesses. Due to the rounded sealing edge, the danger of tear or rupture of the pipe at the sealing area is greatly reduced as opposed to the known art.

According to a second aspect of the present invention there is provided an insert to be sealingly mounted into a plug hole of a pipe, said pipe having a sealing area with an edge defining said plug hole; said insert comprising an internal unit and a fastener both having corresponding sealing portions configured so that, when the fastener is mounted on the internal unit, they sealingly clamp therebetween said sealing area of the pipe as to form therebetween a chamber in which said edge of the sealing area is disposed, said chamber being in fluid communication with the outside environment, allowing atmospheric pressure within the chamber.

The fluid communication with the outside environment may be achieved inter alia by at least one keyway, formed in the internal unit, the fastener or both.

Due to the fluid communication between said chamber and the outside environment, provided in the insert according to the second aspect of the present invention, risk is reduced or completely eliminated that during unexpected leakage in the seal of the pipe and consequent accumulation of the leaking liquid in the region of the sealing area of the pipe to which the insert is mounted, the edge of the sealing area will be subjected to an increased liquid pressure. The reduction or elimination of such risk is particularly advantageous for multi-layered pipes, in which pressurized leaking liquid may penetrate between the pipe's layers and cause serious damage to the pipe, including its rupture.

The internal unit and the fastener of the insert according to the second aspect of the invention may have their sealing portions, as well as their mounting portions, designed as described with respect to the first aspect of the invention, as explained above.

In the insert according to both aspects of the invention, the mounting portion of the internal unit may project from the mounting portion of the fastener, when the latter is mounted on the former, forming a projecting portion, which may serve to connect thereto such irrigation means as branch pipes. Alternatively, said projecting portion may serve as a connector holding portion, being adapted to hold an additional connector for such connection or an irrigation device.

BRIEF DESCRIPTION OF THE DRAWINGS

In order to understand the invention and to see how it may be carried out in practice, one embodiment will now be described, by a way of non-limiting example only, with reference to the accompanying drawings, in which.

DETAILED DESCRIPTION OF EXEMPLARY EMBODIMENTS

Figure 1:
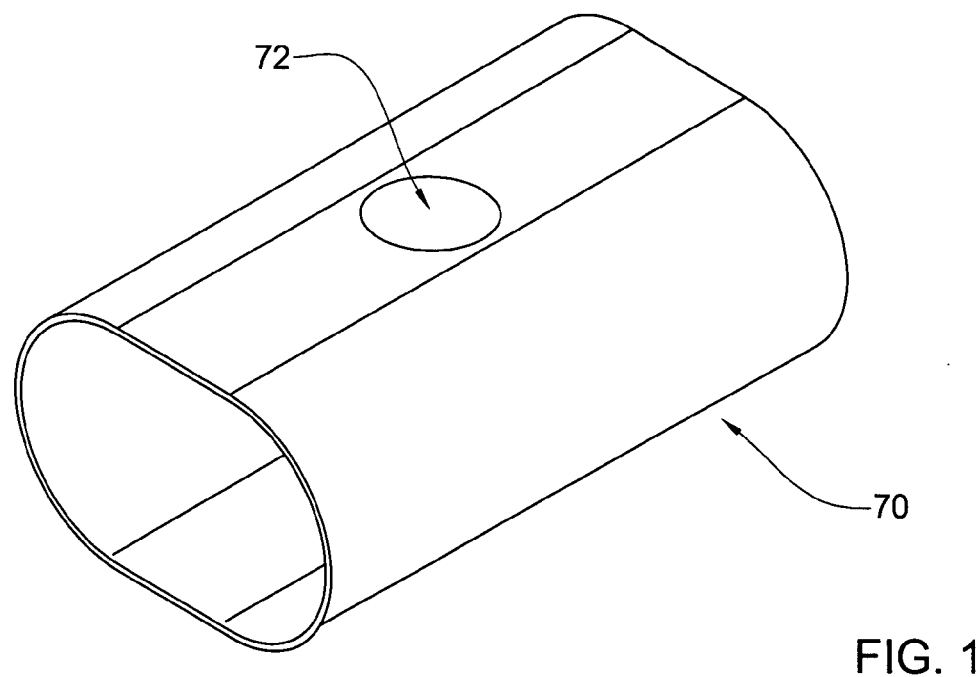
FIG. 1 is an isometric view of a lay-flat pipe to be used in conjunction with an insert according to the present invention.
Figure 2:
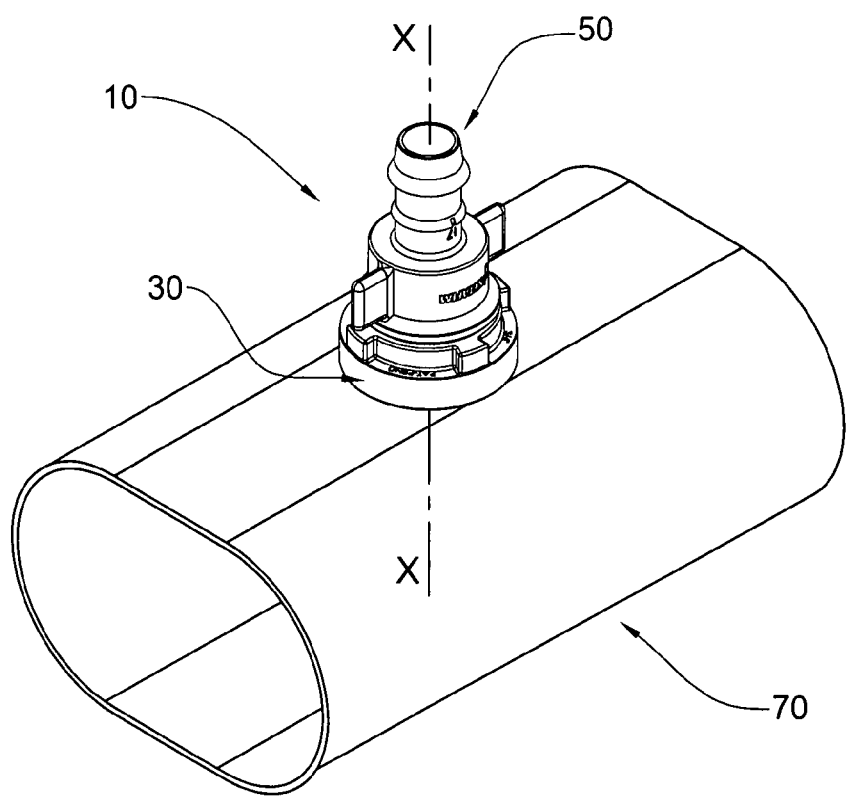
FIG. 2 is an isometric view of an insert according to one embodiment of the present invention, mounted into a plug-hole of the lay-flat pipe of FIG. 1.

FIG. 1 shows a standard lay-flat pipe 70, having a plug hole 72.

Figure 3:
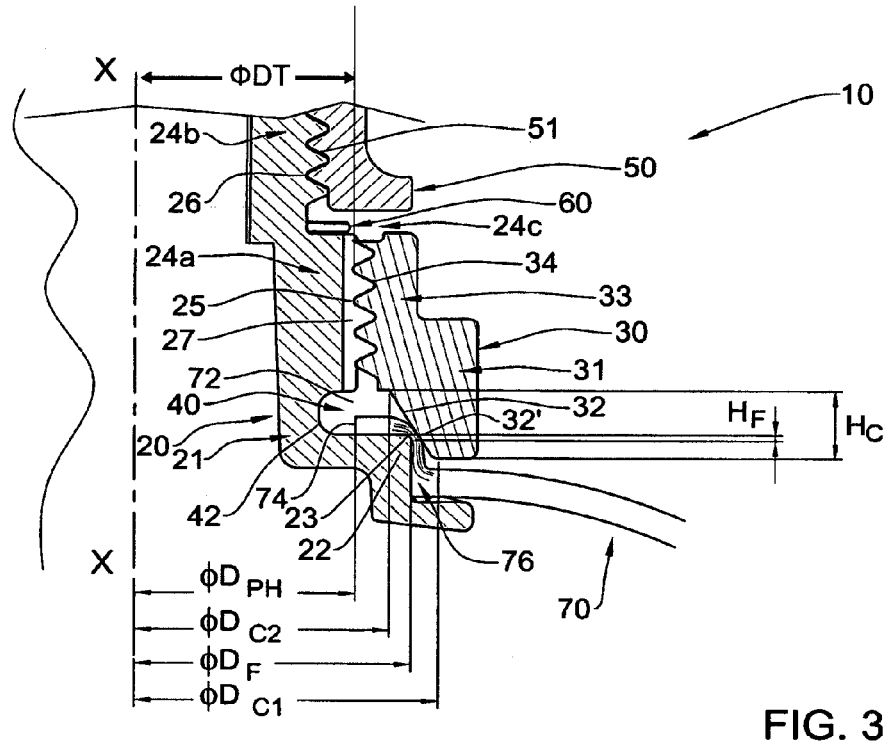
FIG. 3 is a cross-sectional view of the insert shown in FIG. 2.
Figure 4:
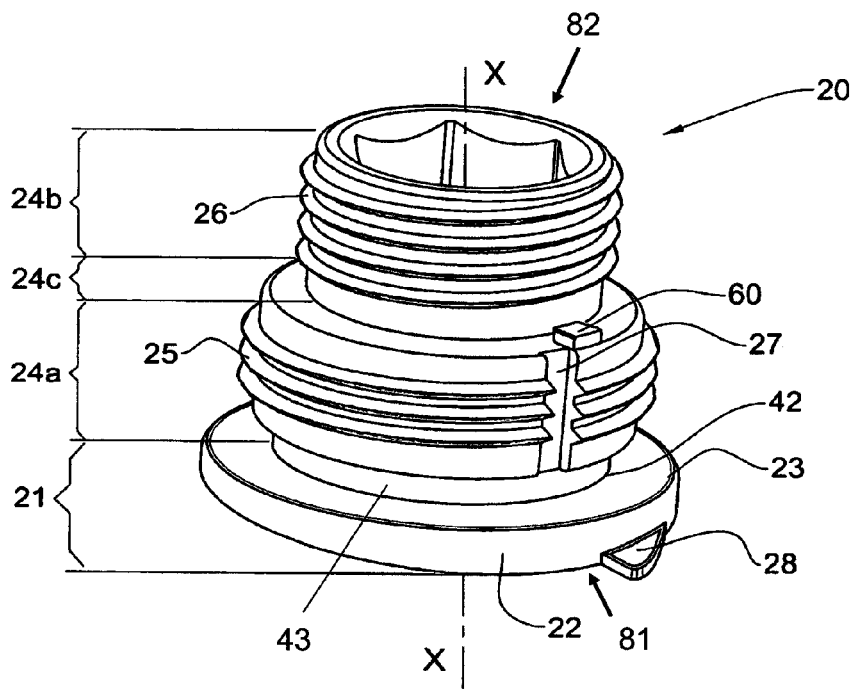
FIG. 4 is an isometric view of an internal unit of the insert shown in FIG. 2.
Figure 5:
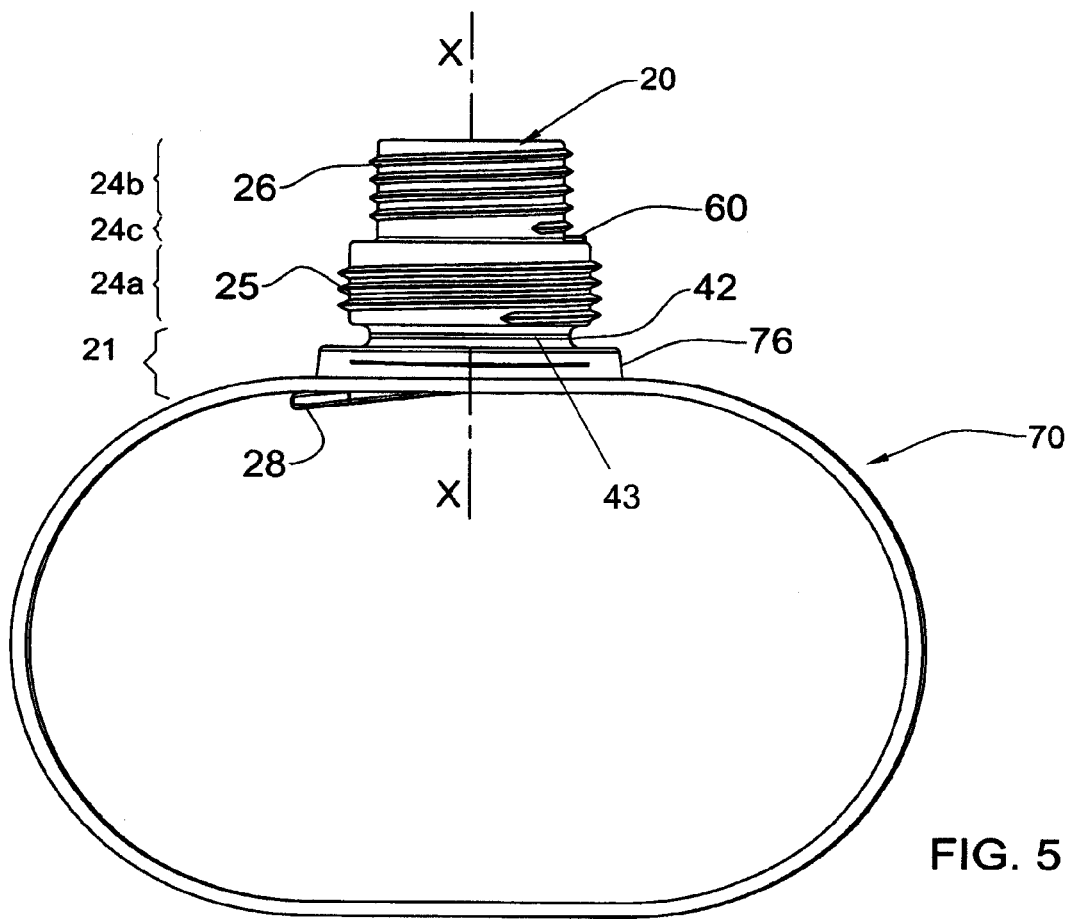
FIG. 5 is a side view of the internal unit shown in FIG. 4, when mounted into a plug-hole of the lay-flat pipe shown in FIG. 1.
Figure 6:
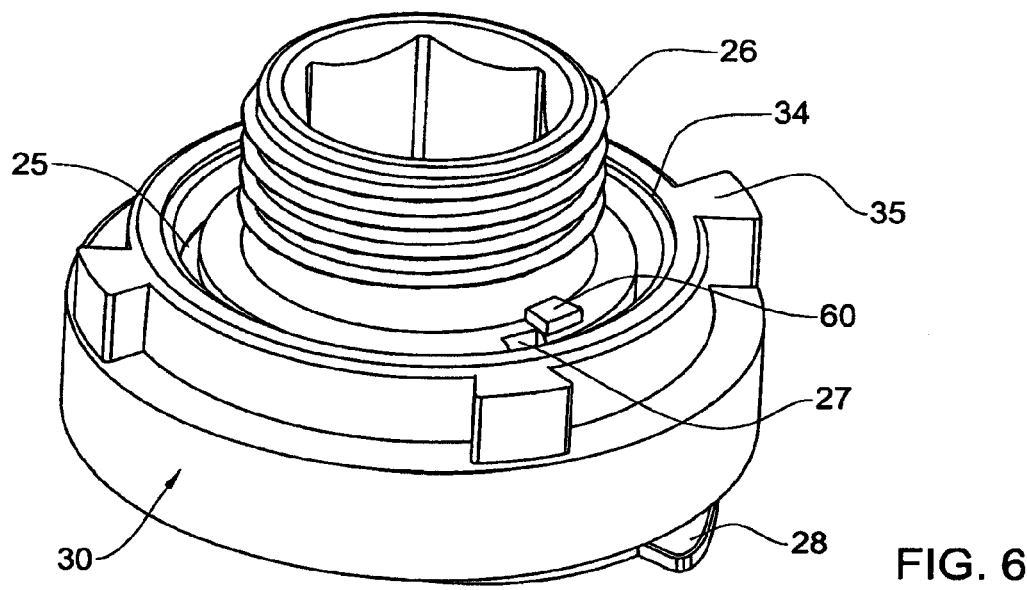
FIG. 6 is an isometric view of the internal unit and a fastener of the insert shown in FIG. 2.

In FIGS. 2 to 6, one example of an insert 10 in accordance with the present invention is shown, mounted into the plug hole 72 to urge the pipe to have, at the vicinity of the plug hole 72, a sealing area 76 with an edge 74 of diameter $D_{PH}$ (seen in FIG. 3). The insert 10 has a longitudinal axis X-X and comprises an internal unit 20, a fastener 30 and a connector 50 coaxially mounted on the internal unit.

Referring to FIGS. 3 to 6, the internal unit 20 is shown having unitary one-piece construction and comprising a sealing portion 21 proximate a first end 81 thereof and a mounting portion 24 proximate a second end 82 thereof. The sealing portion is formed with a flange 22 of external diameter $D_F$ such that $D_F > D_{PH}$. The flange 22 is formed with a rounded sealing edge $D_F$ having axial extension $H_F$. It also has an integral wing-shaped protrusion 28, to facilitate the insertion of the flange 22 into the plug hole 72. The mounting portion 24 of the internal unit 20 has a fastener engaging part 24a with a bottom thread 25, a connector engaging part 24b with a top thread 26, and a spacing 24c therebetween. The connector engaging part 24b is of a smaller diameter than the fastener engaging part 24a. The internal unit 20 is further formed with a recessed region 42 between the flange 22 of the sealing portion 21 and the fastener engaging part 24a of the mounting portion 24, and with keyways 27 axially extending from the recessed region 42 to the region of the spacing 24c. The recessed region 42 thereby forms a narrowed neck region 43 and axially spaces apart the flange 42 of the sealing portion 21 and the bottom thread 25 of the mounting portion 24, the recessed region 42 having a smaller diameter than both the external diameter $D_F$ of the flange 42 and the diameter of the bottom thread 25. A lumen 150 having a peripheral lumen face 155 extends axially through the internal unit 20.

The fastener also comprises a sealing portion 31 and a mounting portion 33. The sealing portion is formed with an internal conical surface 32, which has an axial extension $H_C$ such that $H_C > H_F$, and which has a narrow end with a small diameter $D_{C2}$ and a wide end with a large diameter $D_{C1}$, such that $D_{C1} > DF > D_{C2}$. The mounting portion 33 is formed with an internal thread 34, for screwing the fastener 30 onto the bottom thread 25 of the internal unit 20. As seen in FIG. 3, the internal thread 34 of the fastener 30 has an inner diameter $D_T$ that is smaller than the external diameter $D_F$ of the flange 22. Therefore, the fastener 30 is configured and dimensioned to fit over the internal unit's second end 82, but not over the internal unit's first end 81. The fastener 30 further comprises a plurality of radial fastening protrusions 35, adapted to assist the user to grasp the fastener 30 when screwing it onto the internal unit 20. The mounting portion of the fastener is formed with an integral stopper 60 to ensure the spacing between the connector 50 and the fastener 30 is kept free when both the fastener and the connector are mounted on the mounting portion of the internal unit.

In operation, the wing shaped protrusion 28 of the internal unit 20, is first forced through the plug hole 72 of the pipe 70, followed by the flange 22. Once the flange 22 is inserted into the plug hole 72, the fastener 30 is screwed onto the bottom thread 25 of the internal unit 20, until the sealing area 76 of the pipe 70 is securely clamped between the conical surface 32 at a sealing region 32' thereof and the rounded sealing edge 23. The connector 50 is then mounted on the top thread 26 of the internal unit 20. Fluid communication of the pipe 70 with an outside environment of the pipe is provided by the lumen 150 of the internal unit 20.

In this position, a chamber 40 is created between the recessed region 42 of the internal unit 20 and the area of the conical surface 32 of the fastener disposed between the narrow end $D_{C2}$ of the conical surface 32 and its sealing region 32', such that the edge 74 of the plug hole 72 is disposed in the chamber 40. The keyways 27 which extend between the chamber 40 and the area of the spacing 24c between the fastener 30 and the connector 50 provide fluid communication of the chamber 40 with the outside environment, maintaining atmospheric pressure therein. In the event of leakage from the pipe 70 in the sealing region 32', the liquid will flow into the chamber 40. Due to the atmospheric pressure within the chamber 40, pressurization of the liquid will not take place, and thus the risk of liquid penetrating into the layers of the pipe 70 is reduced, consequently reducing the possibility of extensive damage or rupture of the pipe 70.

In addition to the above measures, due to the fact that clamping of the sealing area 76 of the pipe is achieved between the relatively short axial extension $H_F$ of the sealing edge 23 and the extended conical surface 32 and it may take place at a plurality of locations along the conical surface 32, which allows the use of the insert 10 with pipes having different thicknesses, whereby the risk of leakage in the pipe is reduced, Furthermore, due to the rounded shape of the sealing edge, the risk of damage to the sealing area 76 of the pipe 70 is significantly reduced.

Those skilled in the art to which this invention pertains will readily appreciate that numerous changes, variations and modifications may be made without departing from the scope of the invention *mutatis mutandis*.

The invention claimed is:

1. An insert to be sealingly mounted into a plug hole of a multi-layered pipe, said pipe having a sealing area with an edge surrounding said plug hole, said insert comprising an internal unit and a fastener, said internal unit comprising a sealing portion proximate a first end thereof, a mounting portion proximate a second end thereof, and a recessed region axially spacing apart the sealing portion and the mounting portion, and said fastener being configured and dimensioned to fit over internal unit's second end and having corresponding cooperating sealing portions and mounting portions, said sealing portion of the internal unit being formed with a flange adapted to be forced into said plug hole, said flange and said sealing portion of the fastener having corresponding sealing surfaces adapted to sealingly clamp therebetween said sealing area of said pipe, when the insert is mounted into the plug hole;

said internal unit and fastener are designed such that when the fastener is sealingly mounted on the internal unit, a chamber is created between the recessed region of the internal unit and the fastener, the chamber including the recessed region and being in fluid communication with the outside environment, allowing atmospheric pressure within said chamber, and wherein the edge of the plug hole is located in said chamber so that if leaking liquid reaches the edge it will not be pressurized to penetrate between the layers of the pipe.

2. An insert according to claim 1, wherein fluid communication with the outside environment is in the form of at least one keyway, formed in the mounting portion of either said internal unit or fastener or both.

3. An insert according to claim 2, wherein said insert further comprises a projecting portion spaced from the fastener, for mounting thereon a connector being adapted for sprinkling, irrigation or connection with at least one additional pipe.

4. An insert according to claim 3, wherein said projecting portion is spaced from said mounting portion.

5. An insert according to claim 4, wherein at least one stopper is formed to create said spacing to prevent blockage of said keyway by said connector.

6. An insert according to claim 1, wherein said flange is formed with said sealing edge and said fastener is formed with a conical surface, the latter being adapted to press said sealing area of said pipe against said sealing edge of said internal unit, to provide the required sealing.

7. An insert according to claim 1, wherein:
the internal unit has unitary, one-piece construction.

8. An insert to be sealingly mounted into a plug hole of a multi-layered pipe, said pipe having a sealing area with an edge surrounding said plug hole,
said insert comprising an internal unit, a connector and a fastener;
said internal unit comprising a sealing portion proximate a first end thereof, a mounting portion proximate a second end thereof, and a recessed region axially spacing apart the sealing portion and the mounting portion;
said fastener being configured and dimensioned to fit over the internal unit's second end and having a sealing portion adapted to cooperate with the sealing portion of the internal unit to thereby sealingly clamp said sealing area of said pipe, and
said connector being adapted to be mounted on the internal unit for connecting irrigation means to the insert;
wherein:
said internal unit and fastener are designed such that a chamber is created between the recessed region of the internal unit and the fastener, the chamber including the recessed region and being in fluid communication with the outside environment, allowing atmospheric pressure within said chamber, and
the connector when mounted on the internal unit is kept spaced from the fastener so as to at least partially allow said fluid communication.

9. An insert according to claim 8, wherein the edge of the plug hole is located in said chamber so that if leaking liquid reaches the edge it will not be pressurized to penetrate between the layers of the pipe.

10. An insert according to claim 8, wherein at least one stopper is formed on the insert to create said spacing.

11. An insert according to claim 8, wherein:
the internal unit has unitary, one-piece construction.

12. An irrigation pipe insert having a longitudinal axis and configured to mate with a plug hole formed in a lay-flat irrigation pipe, the irrigation pipe insert comprising:
an internal unit comprising:
a sealing portion proximate a first end of the internal unit, the sealing portion having a flange, the flange having an external flange diameter and being provided with an internal unit sealing surface;
a mounting portion proximate a second end of the internal unit, the mounting portion connected to the sealing portion and having at least one threaded portion; and
a recessed region axially spacing apart the flange and the at least one threaded portion, the recessed region forming in the internal unit a diameter smaller than that of the at least one threaded portion; and
a fastener configured and dimensioned to fit over the internal unit's second end, the fastener comprising a fastener sealing surface;
wherein:
a chamber is created between the recessed region of the internal unit and the fastener, the chamber including the recessed region and being in fluid communication with the outside environment; and
the fastener sealing surface and the internal unit sealing surface oppose one another and are adapted to sealingly clamp a portion of the lay-flat irrigation pipe therebetween, when a lay-flat irrigation pipe is present.

13. The irrigation pipe insert according to claim 12, comprising:
at least one keyway configured to provide fluid communication between the chamber and the outside environment.

14. The irrigation pipe insert according to claim 13, wherein:
the at least one threaded portion engages a connector; and
the at least one keyway extends between the chamber and an area between the fastener and the connector.

15. The irrigation pipe insert according to claim 13, wherein:
the at least one keyway is formed in the mounting portion or in the fastener or both.

16. The irrigation pipe insert according to claim 15, wherein:
the at least one keyway is formed in the mounting portion.

17. The irrigation pipe insert according to claim 15, wherein:
the at least one keyway is formed in the fastener.

18. The irrigation pipe insert according to claim 12, wherein:
the recessed region forms a narrowed neck region between the flange and the at least one threaded portion.

19. The irrigation pipe insert according to claim 12, wherein:
the at least one threaded portion is configured to engage the fastener.

20. The irrigation pipe insert according to claim 12, wherein:
the at least one threaded portion is configured to engage a connector.

21. The irrigation pipe insert according to claim 12, wherein:
the mounting portion comprises a top thread and a bottom thread spaced apart from one another along the longitudinal axis;
the bottom thread is located between the top thread and the flange;
the bottom thread has a diameter larger than that of the top thread;
the bottom thread is configured to engage a fastener; and
the top thread is configured to engage a connector.

22. The irrigation pipe insert according to claim 21, wherein:

the bottom thread of the internal unit is an external thread;

the fastener has a mounting portion provided with an internal thread; and the internal thread of the fastener engages the bottom thread of the internal unit.

23. The irrigation pipe insert according to claim 22, further comprising:

a connector having a connector thread threadingly engaged to the top thread of the internal unit.

24. The irrigation pipe insert according to claim 23, further comprising:

a radially outwardly projecting stopper formed on the internal unit between the top thread and the bottom thread;

wherein the stopper is configured to space apart the connector from the fastener.

25. The irrigation pipe insert according to claim 23, wherein:

the top thread of the internal unit is an external thread; and the connector thread is an internal thread.

26. The irrigation pipe insert according to claim 12, wherein:

the internal unit has unitary, one-piece construction.

\* \* \* \* \*